Figure 3:
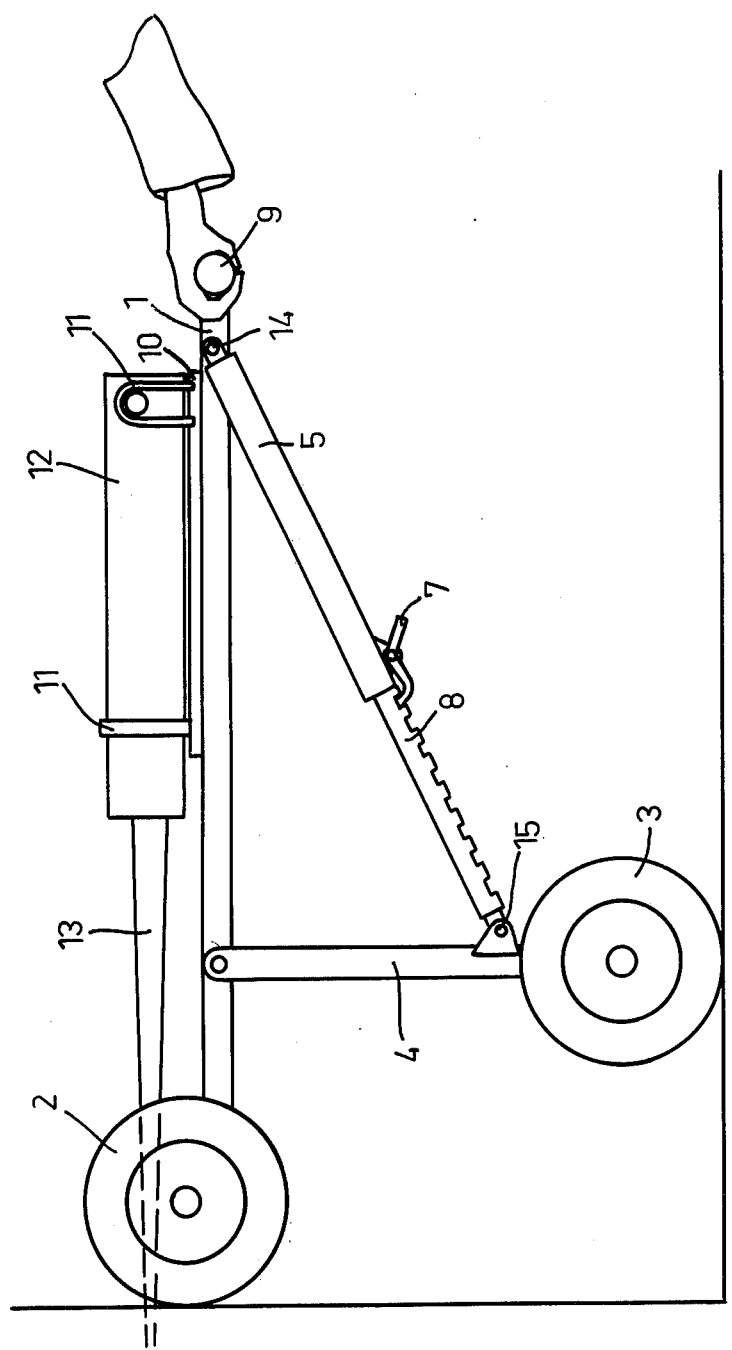

United States Patent [19]

Sjöberg

[11] 4,155,527

[45] May 22, 1979

[54] TROLLEY WITH SUPPORTING STAND

[76] Inventor: Åke L. Sjöberg, Torsdagsgränd 15, 302 53 Halmstad, Sweden

[21] Appl. No.: 898,394

[22] Filed: Apr. 20, 1978

[30] Foreign Application Priority Data

Apr. 21, 1977 [SE] Sweden .................. 7704564

[51] Int. Cl.² .................................. A47B 21/00
[52] U.S. Cl. .................. 248/647; 173/22; 280/47.2
[58] Field of Search ............ 248/2; 173/22, 28; 280/47.17, 47.2, 47.21, 62

[56] References Cited

U.S. PATENT DOCUMENTS

| D.154,776 | 8/1949 | Hooz et al. | 280/47.2 |
|---|---|---|---|
| 2,168,905 | 8/1939 | Lear | 173/22 |
| 2,243,915 | 6/1941 | Mueller | 280/47.2 |
| 2,518,362 | 8/1950 | Neyman | 173/28 |
| 2,661,189 | 12/1953 | Gillerstrom | 173/22 |
| 3,987,807 | 10/1976 | Varnell et al. | 248/188.5 |

FOREIGN PATENT DOCUMENTS 958557  9/1949  France .................. 280/47.2

*Primary Examiner*—Robert A. Hafer
*Attorney, Agent, or Firm*—Laurence R. Brown

[57] ABSTRACT

A trolley comprising a stand having two parallel side rods with a handlebar and a crossbar respectively connecting the upper and lower ends of the side rods. A plurality of front wheels support the stand at the bottom and a pair of rear wheels are connected to the stand by a support shaft and an adjustable brace. The adjustable brace comprises a tube portion with a spring disposed therein and a leg portion partially received within the tube portion and abuttingly compressing the spring. An adjustable locking device secures the two portions of the brace in various positions. The trolley is adapted to securingly support a ground preparation or compacting tool or the like.

2 Claims, 3 Drawing Figures

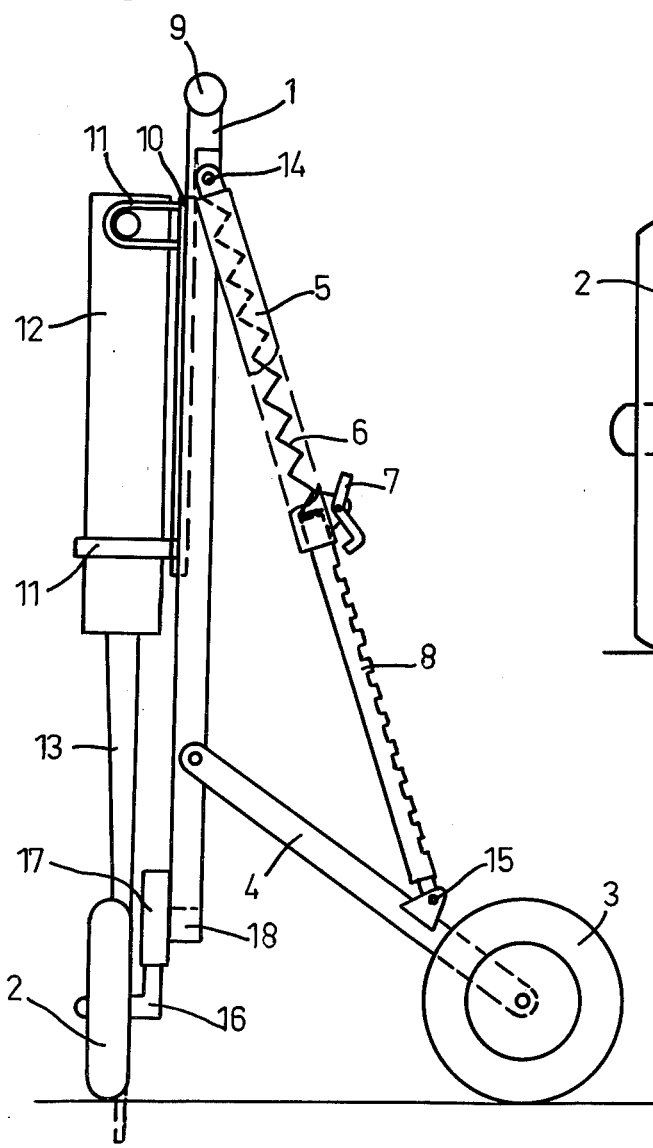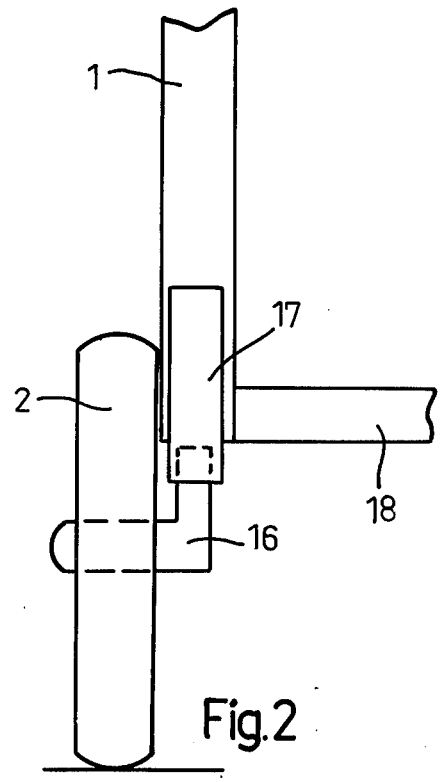

TROLLEY WITH SUPPORTING STAND

The Swedish Pat. Nos. 337203 and 7100994 describe an implement consisting of a trolley with a stand, preferably in the shape of a flat frame, with a control handle at the top and wheels at the bottom, upon the stand being mounted an upwards and downwards movable power unit for a breaker or similar percussion or drilling tool for ground preparation or compacting.

With the aid of the implement described in the aforementioned patent specifications the aim is achieved of relieving the workman of a part of the weight of the power unit as well as of sparing him the vibration accompanying percussion work. The implement does not, however, meet the requirement of being capable of quick and easy lateral movement inasmuch as the trolley has naturally to be turned against the line of movement of the tool when a change of position in any direction other than forward or backward is desired. Nor does it relieve the workman of the weight of the implement in those cases where for the purpose of transport or of breaking up asphalt etc. the trolley has to be tilted downwards towards the ground. The implement also suffers from the weakness that the proposed trolley, by virtue of the fact that it rests upon only one coaxial pair of wheels, is unsteady and unstable, so that even a slight inclination of the trolley away from the workman means that the wheels tend to roll backwards towards him with a risk of injury to his lower extremities.

For obvious reasons the possibility of working a vertical surface is excluded with an implement of this nature.

The present invention is designed to eliminate the aforesaid disadvantages and difficulties as well as to provide for even the heaviest of the power units designed for manual operation a new area of application, namely that of working a vertical surface a moderate height above ground level. This is according to the invention achieved in that rear wheels are connected to the stand by at least one wheel support shaft and at least one brace which can be telescoped against the action of a spring, balances the weight of the trolley and can be locked in various positions.

Further advantages with regard to ease of handling are obtained in that the front wheels are capable of being set either for forward-and-backward or for lateral movement.

The invention is described in more detail below, reference being made to the drawings, in which FIG. 1 is a side view of an implement according to the invention, FIG. 2 is a front view of one side of the implement and FIG. 3 shows an alternative position for working a vertical surface.

FIG. 1 shows a stand with adjustable front wheels 2 and coaxial rear wheels 3, which are connected to the stand by wheel surface shafts 4 and a brace 5-8, which has a swivel attachment to the brackets 14 and 15. The stand has a frame which is essentially flat, consisting of two tubular, parallel side rods 1, a crossbar 18 connecting the lower ends and a handlebar 9 connecting the upper ends of the rods 1. The brace 5-8 comprises a tube 5 in which is affixed a spring 6, and a leg 8 partially received within the tube 5. The received end of the leg 8 is pushed against the action of the spring 6 and the leg 8 is provided with a plurality of recesses. On the tube 5 is a locking device 7, which fits the recesses on the leg 8. The handlebar 9 has steering and operating controls, not shown. A slide 10, which can be moved in the stand 1, 9, 18 by power-exerting means not described here (pneumatic accumulator, hydraulic pump, compressed-air piston), holds a power unit 12, with a tool 13, in guides 11.

FIG. 2 is a front view of the lower part of one side of the implement, showing one front wheel 2, in the position for forwards running, and one axle 16, rotatable in a socket 17. The socket 17 is attached to the stand 1, 9, 18.

Finally FIG. 3 shows an alternative position with the workman holding the handlebar 9 and working a vertical surface.

When the workman is going to use the described implement, he has the choice of having the front wheels 2 set parallel to the rear wheels 3 or having the wheels 2 set at an angle of 90° to the rear ones. In the former case—which occurs when asphalt is being cut—the workman tilts the trolley towards himself at the desired angle, locks the brace 5-8 with the locking device 7 and then rolls the trolley forward as the power unit 12 works the appropriate tool 13, making consecutive cuts of the required depth in the ground. Thus the weight of the implement is here borne by the front wheels 2 and the rear wheels 3, and the workman has only to concentrate on moving the trolley forward at whatever tempo he wishes and on operating the controls on the handlebar 9 to let the power unit 12 work in the way he finds best.

In the latter case—if the wheels 2 are set at an angle of 90° in relation to the rear wheels 3—the workman can easily and comfortably work in a sideways direction. This lateral movement is suited for the breaking up of asphalt or concrete. He then tilts the stand 1, 9, 18 somewhat away from himself, raising the rear wheels 3 from the ground, applies the tool 13 at the chosen spot and lets it drive down into the ground. When the tool 13 has reached the required depth, he lowers the stand 1, 9, 18 towards himself, bringing up chunks of the broken asphalt or pushing the cracked concrete away. When the power unit 12 with the tool 13 has been extracted with the aid of the power-exerting means, not described here, which drives the slide, the workman initiates the next breaking movement by returning the stand 1, 9, 18, the weight of which is balanced by the brace 5-8, easily to the vertical, rolls the trolley sideways again to the next spot for breaking, and repeats the operation.

When the front wheels 2 are set for changes of position in a sideways direction the workman is not restricted merely to lateral movement. By tilting the stand at approximately 45° to the ground he can make tight circles; also he can easily draw the implement backwards, particularly when the power unit 12 is in its upper position, as the centre of gravity is then above the rear wheels 3.

When the trolley is being moved over a greater distance, the workman may choose to have all four wheels 2 and 3 parallel and roll the trolley forward as a four-wheeler. Alternatively he may, if an uneven surface or other circumstances make it desirable, lock the stand 1, 9, 18 at the required angle to the wheel support shaft 4 by means of the locking device 7 and then roll the trolley on its rear wheels 3 as a two-wheeler.

As can be seen from the foregoing, the device proposed here has outstanding qualities, both in relieving the workman of a weight of the implement 12 when using or moving it, and in allowing easy and convenient changes of position in any direction. Another important factor is stability, achieved here by the use of four wheels, compared with known implements on two wheels, which are unsteady and which are questionable from the safety aspect.

No less important is the fact that the present invention opens a whole new area of application to the heavier of those power units which are normally wielded manually. As is shown by FIG. 3 it is possible to work a vertical surface, such as a concrete wall, with even the heaviest of the manually operated chipping machines and drills. To do this one locks the brace 5-8 with the locking device 7 so that the wheel support shaft 4 forms an angle of approximately 90° to the stand 1, 9, 18, lifts the latter up, and guides the wheels 2 up to the wall, after which one can begin chipping or drilling. The practical result thus obtained, that of being able to chip brick or concrete walls using an implement desgined for ground preparation or compacting, has been reached after exhaustive field testing and minute study of the optimum geometry, i.e. of how to obtain the maximum number of positions and angles with as uncomplicated a design as possible.

The invention must not of course be regarded as being restricted to the particular embodiment exemplified in the description and the figures. The brace 5-8 may thus be of different design, and the front wheels 2 may be attached to the stand 1, 9, 18 in some other way.

I claim:

1. A trolley comprising a stand, a control handle disposed at a first portion of the stand, a plurality of first wheels disposed at a second portion of the stand, the stand being adapted for securingly supporting a tool, a plurality of second wheels, at least one wheel support shaft and at least one brace connecting the second wheels to the stand, a spring operatively connected to the brace, the brace being telescopable against the action of the spring, and locking means for locking the brace in various positions, the brace balancing the weight of the trolley and the tool securingly supported by the trolley.

2. The trolley of claim 1 wherein the first wheels are adjustable for one of forward and backward movement, and lateral movement.

* * * * *